(12) United States Patent
Kofman et al.

(10) Patent No.: US 7,085,998 B2
(45) Date of Patent: Aug. 1, 2006

(54) MAPPING A PRINT STREAM FOR PRINTING ON MAILERS FROM A FIRST APPLICATION FOR INPUT TO A SECOND APPLICATION

(75) Inventors: Gene I. Kofman, Parkland, FL (US); Josh L. Fabel, Boca Raton, FL (US); Warren M. Fabel, Boca Raton, FL (US)

(73) Assignee: Laser Substrates, Inc., Boca Raton, FL (US)

( * ) Notice: Subject to any disclaimer, the term of this patent is extended or adjusted under 35 U.S.C. 154(b) by 593 days.

(21) Appl. No.: 10/133,100

(22) Filed: Apr. 26, 2002

(65) Prior Publication Data

US 2004/0205467 A1    Oct. 14, 2004

Related U.S. Application Data

(60) Provisional application No. 60/367,118, filed on Mar. 22, 2002.

(51) Int. Cl.
*G06F 3/00* (2006.01)
*G06F 17/00* (2006.01)

(52) U.S. Cl. .............. 715/505; 715/506; 715/507; 715/520

(58) Field of Classification Search ............ 715/500, 715/505, 506, 507, 517, 520, 526
See application file for complete search history.

(56) References Cited

U.S. PATENT DOCUMENTS 6,031,625 A * 2/2000 Sherman et al. ........... 358/1.18
6,230,143 B1 * 5/2001 Simons et al. ............... 705/14
6,282,524 B1    8/2001 Kramer
6,337,743 B1    1/2002 Brown et al.
6,621,591 B1 * 9/2003 Kramer et al. ............. 358/1.15
2001/0056387 A1 * 12/2001 Magary et al. ............... 705/30
2002/0059265 A1 * 5/2002 Valorose, III ............... 707/100
2002/0078663 A1 * 6/2002 Kramer et al. ............... 53/411

(Continued)

OTHER PUBLICATIONS

MSN Money, "Standard Register and HarrisData Announce Strategic Marketing Alliance to Provide Secure Document Delivery", Dayton, Ohio—(Business Wire)—May 3, 2002, http://news.moneycentral.msn.com/ticker/article.asp?Feed=BW&Date=20020503&ID=1611076&Symbol=US:SR.

(Continued)

*Primary Examiner*—Stephen Hong
(74) *Attorney, Agent, or Firm*—Jon A. Gibbons; Fleit, Kain, Gibbons, Gutman, Bongini & Bianco P.L.

(57) ABSTRACT

A system, method and computer readable medium for mapping print stream data for printing on business forms or mailers is disclosed. The method on a computer system includes the definition of a source template and a target template. A source template defines the content and zones of a source document. A source document is a document containing financial or account information. A target template defines the content and zones of a target document. A target document is the document that is printed onto a business form or mailer. The print stream data is received and, using the source template, the print stream data is parsed and content is extracted. Then, the extracted content is placed in zones in the target template to produce a target document, which is printed onto a business form or mailer. The target document can be sent to an output destination including a printer or other application.

35 Claims, 15 Drawing Sheets

U.S. PATENT DOCUMENTS

2002/0082935 A1* 6/2002 Moore et al. ................. 705/26
2003/0023522 A1* 1/2003 Dutta et al. .................. 705/31
2003/0131312 A1* 7/2003 Dang ........................ 715/500
2004/0054630 A1* 3/2004 Ginter et al. ................. 705/53

* cited by examiner

|  |  | 401 | 410 |
| --- | --- | --- | --- |
|  | 402 |  | Invoice |

Atek
113 NW 78th Place
Parkland, FL 33067

| DATE | INVOICE # |
| --- | --- |
| 4/9/2001 | 84 |

BILL TO

| 404 | P O NO | TERMS | PROJECT | 406 |
| --- | --- | --- | --- | --- |
|  |  |  | CollMethod Posting |  |

| QUANTITY | DESCRIPTION | RATE | AMOUNT |
| --- | --- | --- | --- |
| 4 | Fixed GL JE corrupted records Changed wrong company from ID, merged spleted documents 04/03/2001. | 1 00 | 4 00 |
| 2 | Analysed double posting on Acct 1007 for bad check 121221,121242 in view of Chart of Accounts Period Detail Inquiry results 04/03/2001 | 1 00 | 2 00 |

408

Total    $6 00

FIG. 4

702 Please return this portion with your payment in the envelope provided 704    706

SOLD TO:    DATE:    INV. #    AMOUNT    PAYMENTS    AMOUNT OWED

STATEMENT
Account Number

Statement Date

708

TOTALS:

Laser Substrates, Inc.
6251-C Park of Commerce Blvd
Boca Raton, FL 33487-8202    710
EIN# 59-2686933

Please retain this portion for your records
Toll Free: 800-538-4900
STATEMENT    712

Statement Date
Account No.

DATE    INVOICE NUMBER    AMOUNT    PAYMENTS    AMOUNT OWED

714

TOTALS:

FIG. 7

MAPPING A PRINT STREAM FOR PRINTING ON MAILERS FROM A FIRST APPLICATION FOR INPUT TO A SECOND APPLICATION

CROSS-REFERENCED APPLICATIONS

This non-provisional application is based on the provisional patent application Ser. No. 60/367,118 with inventors Kofman et al., entitled "MAPPING A PRINTER STREAM FOR PRINTING ON POSTAL FORMS" filed Mar. 22, 2002, which is hereby incorporated by reference in its entirety.

The subject matter of the present application is related to the following commonly owned U.S. Patents: U.S. Pat. No. 5,865,717, filed Jun. 7, 1995, issued Feb. 2, 1999 to Fabel for a Mailing Form for Non-Impact Printing, U.S. Pat. No. 6,095,919, filed Oct. 27, 1998, issued Aug. 1, 2000 to Fabel for an Extendible Form for Non-impact Printer and U.S. Pat. No. 6,173,888, filed Feb. 2, 1999, issued Jan. 16, 2001 to Fabel for a Mailing Form for Non-Impact Printing. The subject matter of the present application is related to the following commonly owned U.S. Application: U.S. application Ser. No. 09/557,492, filed Apr. 24, 2000, to Fabel for a Mailing Form for Non-impact Printing. The U.S. Application and each of the U.S. Patents described above are hereby incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of automating business forms and mailers and more specifically to automating business forms and mailers by mapping print stream data from a first application and for input to a second application.

2. Description of Related Art

As technology progresses, the business office is becoming more and more automated. Faxes, file servers, email, teleconferencing and cell phones have revolutionized the way firms do business. Mailers, in particular, have enjoyed increasing popularity. A mailer is a consumable paper product that allows for quick and easy printing and mailing of information. A mailer can include an envelope, an insert and a return envelope, which may be created by folding the original document. For example, mailers are used to send account statements, invoices, checks, and tax forms to customers and employees of a business. The commonly owned U.S. Patents and U.S. Application described above provide more information on mailers. A mailer allows a firm or small business to print directly onto one product all of the information necessary for mailing to a customer, client or employee. This is advantageous as it eliminates the separate printing of an envelope, an insert and a return envelope, as well as the need for the insertion of the return envelope and the insert into the envelope. Mailers, however, do not come without their drawbacks.

One problem with the use of a mailer is producing the mailer. Mailers often require folding and sealing before sending out. Current folding/sealing machines are bulky and costly. Thus, businesses are forced to buy additional hardware, apart from software and printers, in order to produce a mailer. This is cost prohibitive for medium and small businesses. Therefore, a need exists to provide a cost effective method of producing mailers for medium and small businesses.

One problem with the production of business forms, such as mailers, is the compatibility of business forms with the applications providing the information. Currently, various applications providing information, such as QuickBooks, support only certain business forms that are provided by the same entity that provides the application. This is disadvantageous as it limits the range of business forms available to the users that are utilizing the application of the providing entity. It would be advantageous to allow additional firms to provide business forms on which to print the information that is provided by these entities. Therefore, a need exists for a method for printing information from various applications onto various business forms provided by separate entities.

Yet another problem with the production of business forms is that current business form printing software often does not allow for the extraction of information from multiple source documents or the placement of extracted information into multiple business forms. Typically, information is garnered from a source document and printed onto a business form or mailer. However, users of business form printing software sometimes desire to garner information from more than one source document. In addition, users sometimes desire to print garnered information into alternate business form(s). Therefore, a need exists for a system that supports the garnering of information from multiple source documents and the placement of garnered information into multiple business forms.

Yet another problem with the production of business forms is that current business form printing software does not allow for the printing of customized information onto the business form. Users of business form printing software often desire to print customized information, such as logos or signatures, onto business forms. It would be advantageous to allow the printing of such information as it would increase the customizability of the business form printing software and further automate the printing of information onto business form. Therefore, a need exists for a system that allows for the printing of customized information onto a business forms.

Yet another problem with the production of business forms is that current business form printing software requires duplex or multiple pass printers. This is disadvantageous and the current installed base of printers substantially comprises simplex or single pass printers. It would be advantageous for business form printing software to support the current installed base of single printers as it is cost effective for those users to continue using their current printers, as opposed to purchasing new printers. Therefore, a need exists for a business form printing system that supports simplex or single pass printers.

Yet another problem with the production of business forms is that current business form printing software often does not allow for importing or exporting from or to other software packages or operating systems. Users of business form printing software sometimes desire to garner information from more than one document over more than one application or over more than one operating system. In addition, users of business form printing software sometimes desire to print information onto more than one business form over more than one application or over more than one operating system. Therefore, a need exists for a system that imports multiple source documents over multiple applications and operating systems and that exports information into multiple business forms over multiple applications and operating systems.

Yet another problem with the production of business forms is that business form printing software often does not allow for the application of PC postage. Typically, PC postage is printed onto a predefined location on a business form or mailer. In addition, the PC postage aspect of a business form or mailer is protected by security measures limiting a user's access to the PC postage information. This is disadvantageous as it limits the customizability of the formatting of information on the business form or mailer. Therefore, a need exists for a system that allows for the relocation and rearrangement of PC postage while complying with security measures protecting PC postage.

Therefore, a need exists to overcome the problems with the prior art as discussed above, and particularly for a way to efficiently map information between incompatible applications and to print data onto a business form or mailer.

SUMMARY OF THE INVENTION

Briefly, in accordance with the present invention, disclosed is a system, method and computer readable medium for mapping print stream data for printing on business forms or mailers. In an embodiment of the present invention, the method on a computer system includes the definition of a source template and a target, or destination, template. A source template defines the zones of a source document and the content in each zone. A source document is a document comprising a statement of account, an account report or an invoice. A target template defines the zones of a target document and the content that shall be placed in each zone. A target document is the document that is printed onto a business form or mailer. The mapping operation begins with the reception of print stream data. Using the source template, the print stream data is parsed and content is extracted. Then, the extracted content is placed in pre-defined zones in the target template to produce a target document. The target document is then printed onto a business form or mailer.

In an embodiment of the present invention, the method includes a loop wherein additional print stream data is provided in the event that the current print stream data lacks information necessary to complete the target document.

The described embodiments of the present invention are advantageous as they allow for the automation of printing of business forms or mailers. Target documents are printed using the print stream data of a source document. This allows for the quick and easy printing of a business form or mailer. Another advantage of the present invention is that the method of the present invention is transparent to the user. Because the user simply prints a source document to produce a printed business form or mailer, little or no interaction is needed with the proposed system. This results in increased usability. Yet another advantage of the present invention is the mapping of information between incompatible applications. This is beneficial as it facilitates the use of information across different applications and formats.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 4 is a representation of a source document, of FIG. 3 of the present invention.

FIG. 7 is a representation of a target document of FIG. 6, in one embodiment of the present invention.

DESCRIPTION OF THE PREFERRED EMBODIMENTS

Overview

Figure 1:
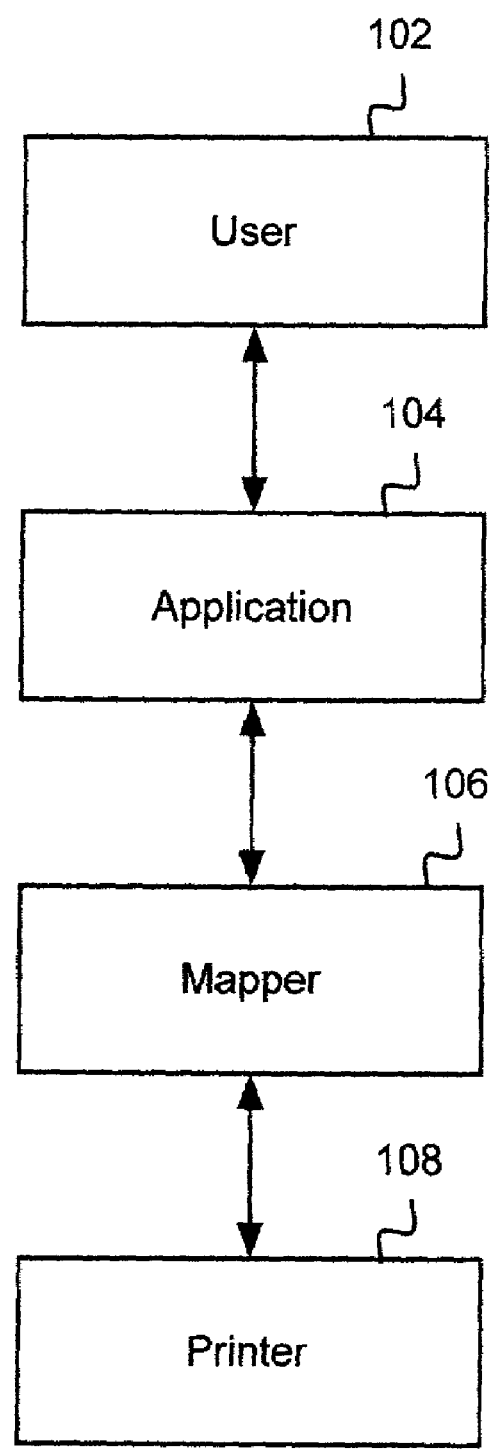
FIG. 1 is a block diagram illustrating the overall system architecture of one embodiment of the present invention.

FIG. 1 is a block diagram illustrating the overall system architecture of one embodiment of the present invention. A user 102 utilizes a client computer system to execute an application 104. A mapper 106 performs the mapping operation of the present invention, i.e., capturing the print stream and mapping to a business form or mailer, and prints to a printer 108. In an embodiment of the present invention, application 104 and mapper 106 execute on the same client computer system. In another embodiment of the present invention, application 104 and mapper 106 execute on separate computer systems that are connected via a network. An example network is described below.

The application 104 is a financial software application such as QuickBooks or Peachtree. In another embodiment of the present invention, application 104 is any application that routinely sends information to a printer 108, such as a word processor, a spreadsheet program, a presentation program or a graphic art design application.

The computer systems on which application 104 and mapper 106 execute comprise one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems on which application 104 and mapper 106 execute are one or more server systems (e.g., SUN Ultra workstations running the SunOS or AIX operating system or IBM RS/6000 workstations and servers running the AIX operating system). The printer 108 is a commercially available printer, such as a non-impact printer, a laser printer, an inkjet printer, a bubblejet printer, a dot matrix printer, a thermal printer, or the like.

In an alternate embodiment of the present invention, FIG. 1 includes a network for connecting application 104, mapper 106 and printer 108. The network is a circuit switched network, such as the Public Service Telephone Network (PSTN). In another embodiment of the present invention, the network is a packet switched network. The packet switched network is a wide area network (WAN), such as the global Internet, a private WAN, a local area network (LAN), a telecommunications network or any combination of the above-mentioned networks. The network is a wired network, a wireless network, a broadcast network or a point-to-point network.

Operation of the Invention

Figure 2:
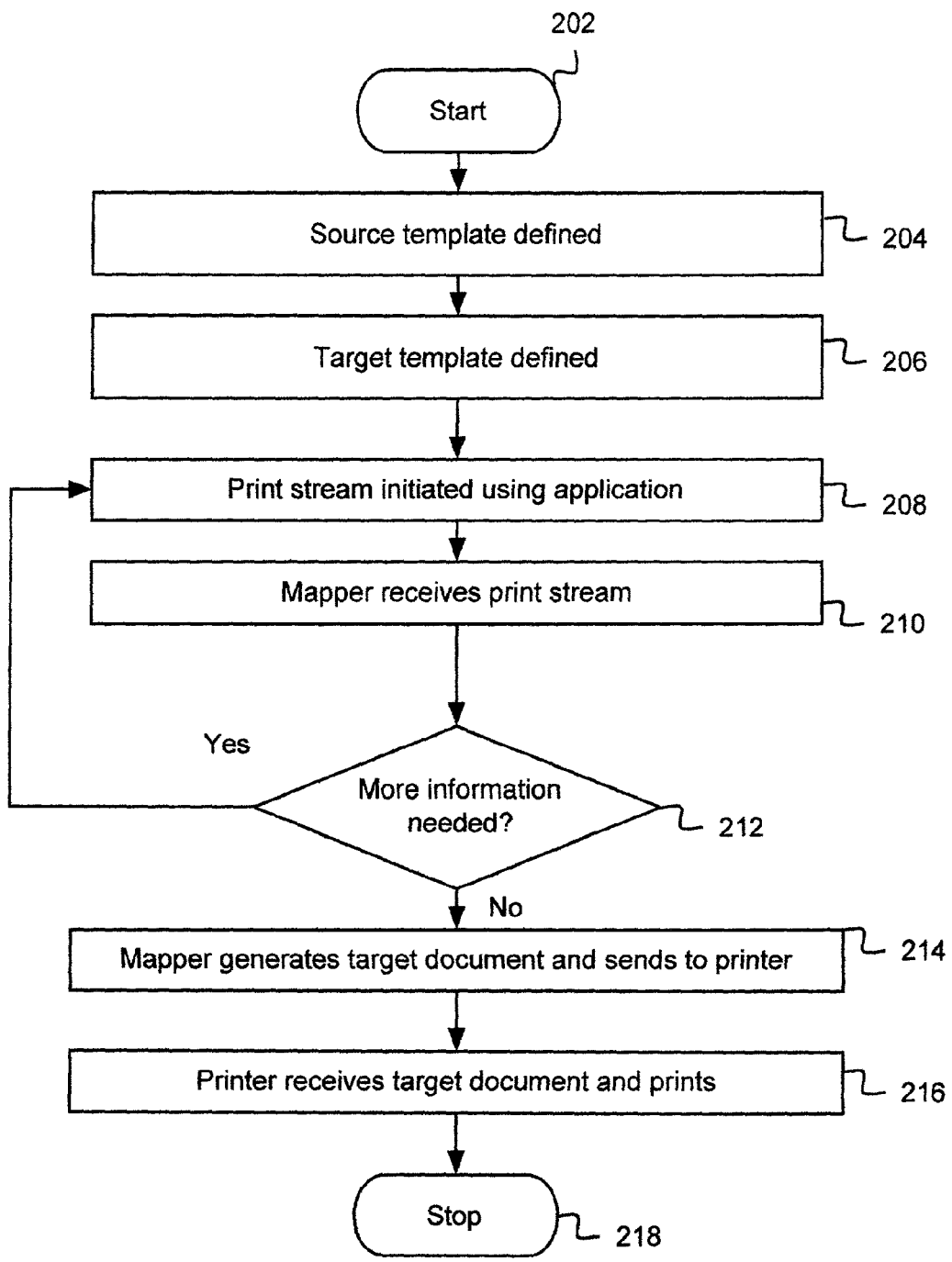
FIG. 2 is a flowchart depicting the operation and control flow of the overall process of FIG. 1 of the present invention.

FIG. 2 is a flowchart depicting the operation and control flow of the overall process of FIG. 1 of the present invention. The control flow of FIG. 2 begins with step 202 and flows directly to step 204. In step 204, a source template is defined. A source template is a file that defines the zones and content of a source document. Source templates and source documents are described in greater detail below (see FIG. 3 and FIG. 4). In one alternative, the user 102 defines the source template using an application, such as one described below in greater detail (see FIG. 5). In another alternative, the source template is defined by another entity, such as a service provider, separate from user 102. In this alternative, the service provider can be the same entity as the entity which provided the system of the present invention.

In step 206, a target, or destination template, is defined. A target template is a file that defines the zones and content of a target document. Target templates are described in greater detail below (see FIG. 6 and FIG. 7). In one alternative, the user 102 defines the target template using an application, such as one described below in greater detail (see FIG. 8). In another alternative, the target template is defined by another entity, such as a service provider, separate from user 102. In this alternative, the service provider can be the same entity as the entity which provided the system of the present invention.

In an optional step after step 206, the user 102 defines set-up information. In this step, the user 102 defines information that is used in the printing process, described in greater detail below. Set-up information can include static information that is printed onto the business form or mailer. Static information is defined as information that is printed on a business form or mailer and that does not change over a set of business forms or mailers. Dynamic information, on the other hand, is defined as information that is printed on a business form or mailer and that may change over a set of business forms or mailers. For example, if a user 102 prints a set of mailers including a check to a customer, the static information includes such information as the return address on the mailer, the bank information on the check and the postage on the mailer. The dynamic information includes such information as the address on the mailer, the recipient's name and the amount of the check. Other examples of set-up information that may be specified by a user 102 in this optional step includes one or more of the following:

Company logos
PC postage conforming to the Information Based Indicium Program (IBIP) standard
Bar codes used to identify other information in the mailer, such as an account number, a check number or an invoice number
Signatures printed on a letter or on a check
Bank information conforming to the Magnetic Ink Character Recognition (MICR) standard and using a standard font, such as E13B MICR font, including:
Bank routing number
Bank account number
Check number
Account name
Account address In an embodiment of the present invention, security measures are taken during the input and modification of set-up information in this optional step. In this embodiment, a user is authenticated, such as via a login name and password, before he is able to input or modify set-up information. This allows sensitive information, such as one or more signatures printed on a check, to be protected from unauthorized access by a user.

In step 208, a print stream including a source document is initiated using application 104. Source documents are described in greater detail below. In one embodiment of the present invention, the user 102 issues a print command via application 104. In step 210, the mapper 106 receives the source document in the print stream data. It should be noted that in this document, the terms "file" and "document" are used interchangeably. Both terms are used to refer to a single sequence of bytes of finite length stored in a non-volatile storage medium.

In step 212, the mapper 106 determines whether the target document to be printed requires information that is not present in the source document. If the result of this determination is positive, control flows back to step 208. If the result of this determination of is negative, control flows to step 214. If the result of the determination of step 212 is positive, in one embodiment of the present invention, mapper 106 determines that mapper 106 must receive additional information in order to complete the target document to be printed. Subsequently, mapper 106 acquires the required information by searching for and reading a document or documents that hold the required information. Alternatively, mapper 106 communicates to application 104 the information it requires and application 104 provides the required information to mapper 106 in step 208. This may be, for example, printing one type of output from an application 104 such as an invoice followed by a second type of action such as printing a check. The mapper 106 assembles the information needed from the one or more output print jobs from the application 104.

In another embodiment of the present invention, if the result of the determination of step 212 is positive, mapper 106 communicates to the user 102 that mapper 106 must receive additional information in order to complete the target document to be printed. The user 102 subsequently provides the additional information to the mapper 106 by printing in step 208 an additional source document, which includes the information the mapper 106 requires to complete the target document to be printed. In this embodiment of the present invention, the mapper 106 provides to the user 102 a pop-up window indicating the additional information necessary to complete the target document to be printed.

In step 214, the mapper 106 generates the target document to be printed, and sends the target document to printer 108. This operation is described in greater detail below. In step 216, the printer 108 receives the target document from mapper 106 and proceeds to print the target document. In step 216, the target document is printed onto a business form or mailer. In step 218, the control flow of FIG. 2 ceases.

Source Template

Figure 3:
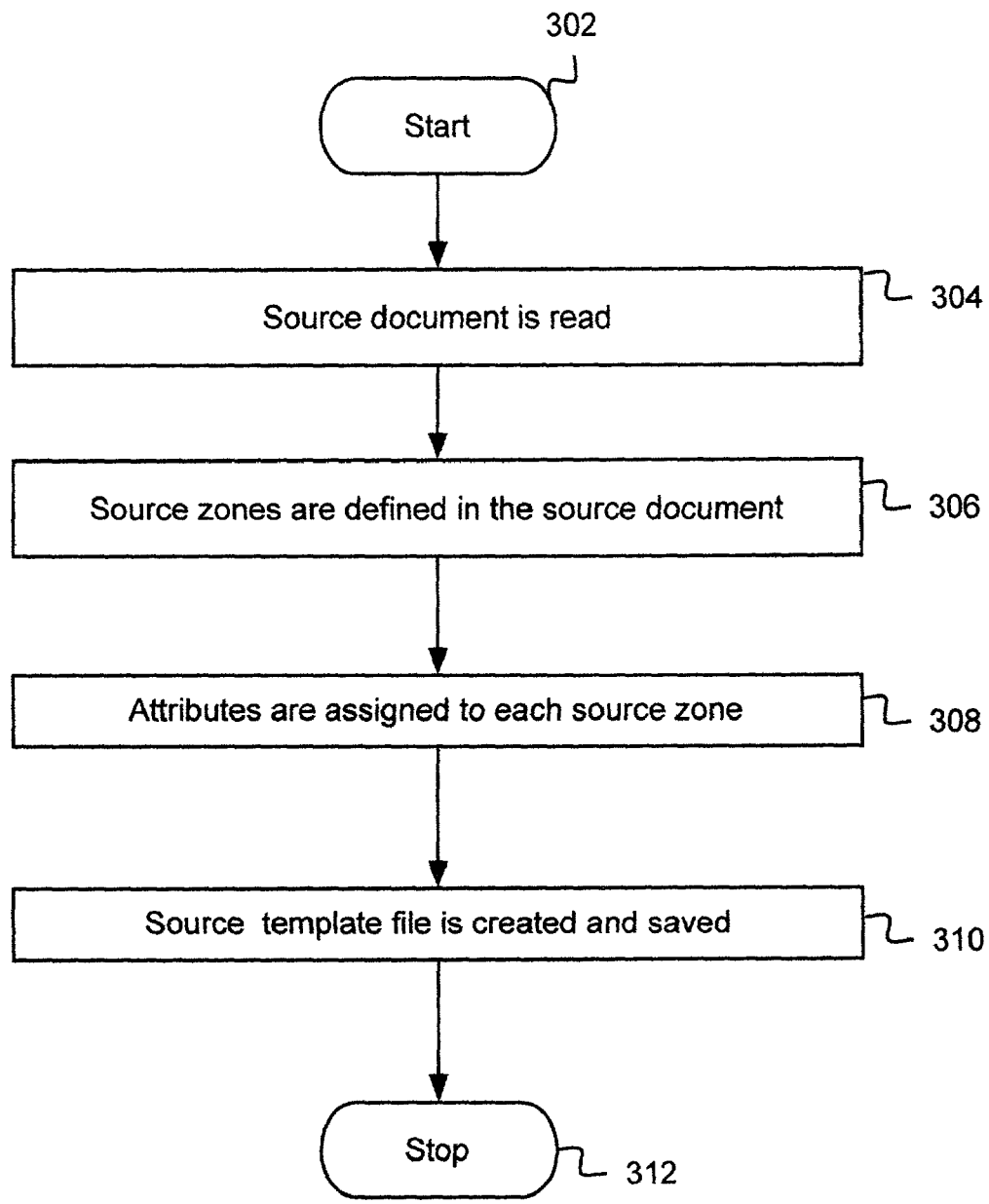
FIG. 3 is a flowchart depicting the operation and control flow of the source template generation process of FIG. 2 according to the present invention.

FIG. 3 is a flowchart depicting the operation and control flow of the source template generation process of FIG. 2, according to the present invention. FIG. 3 describes in more detail the step 204 of FIG. 2. The control flow of FIG. 3 begins with step 302 and flows directly to step 304. In step 304, a source document is read by an application program used for generating a source template. Such an application is described in greater detail below in FIG. 5. It should be noted that the present invention supports various types of source documents. Typically, the source document is a document including information that is directed to clients, customers or employees of a business. In addition, the source document is generated by an application 104. As explained above, application 104 is, for example, a financial software application such as QuickBooks or Peachtree or any other software application containing financial or account information. Thus, in this example, the source document is an invoice, a client account statement, a billing statement, an account report, a check or the like.

In step 306, source zones are defined in the source document. A source zone is an area of a source document that provides content information that may be placed in a target document. The content information in a source zone is considered dynamic content information. Several types of source zones are defined, wherein each type of source zone contains a certain type of content information. The following are examples of source zone types:

Key Zone: Contains keywords associated with the source document
Text Zone: Contains text
Picture Zone: Contains an image
Table Zone: Contains a table or other tabular data
Address Zone: Contains a mailing address In step 308, attributes are assigned to each source zone. Examples of attributes that may be assigned to a source zone are the name of a source zone, the location of a source zone (expressed in pixel coordinates) and the format of the content information in the source zone.

In step 310, a source template file is generated and saved. The source template file contains, at a minimum, a list containing each source zone and the pixel coordinates defining the location of each source zone in the source document. The source template file is a text file, an HTML file, an SGML file, an XML file, or any other file format conducive to holding a hierarchical structured data set. An example of a source template file written in text format, is shown below:

[Zones]
key1=key,5.991,0.719,1.011,0.146!
address=text,0.865,0.146,2.563,1.323!
bill to=text,0.542,1.833,3.365,1.198!
date=text,6.002,0.938,0.844,0.198!
invoice=text,7.116,0.917,0.761,0.208!
terms=text,5.117,3.683,1.2,0.317!
project=text,6.418,3.646,1.532,0.365!
total=text,6.95,9.51,1.011,0.354!
note=text,0.05,9.482,5.408,0.425!
description=text,1.032,4.396,4.428,0.604!
quantity=text,0.479,4.406,0.479,0.604!
rate=text,6.418,4.396,0.26,0.604!
amount=text,7.429,4.406,0.448,0.625!
pono=text,3.959,3.656,1,0.354!
key#invoice=key,6.845,0.177,1.115,0.292!
key#quantity=key,0.042,4.125,0.875,0.198!

In step 312, the control flow of FIG. 3 ceases.

FIG. 4 is a representation of a source document, of FIG. 3 of the present invention. As described above, a source document is any document that is printed from application 104. Specifically, a source document is a document that contains financial or account information that the user 102 desires to access. In FIG. 4, the source document is an invoice that is printed from a financial management software application, such as QuickBooks. The source document of FIG. 4 shows a title for the document at 401#an invoice. FIG. 4 further shows a client address 402 and an invoice number 410. The invoice of FIG. 4 also shows a transaction description column 404, which provides information on a transaction for which the customer is being charged, and an amount column 406, which defines the amount the customer is being charged for each transaction. Lastly, the invoice of FIG. 4 shows a total price 408, which defines the total amount the customer is being charged.

Figure 5:
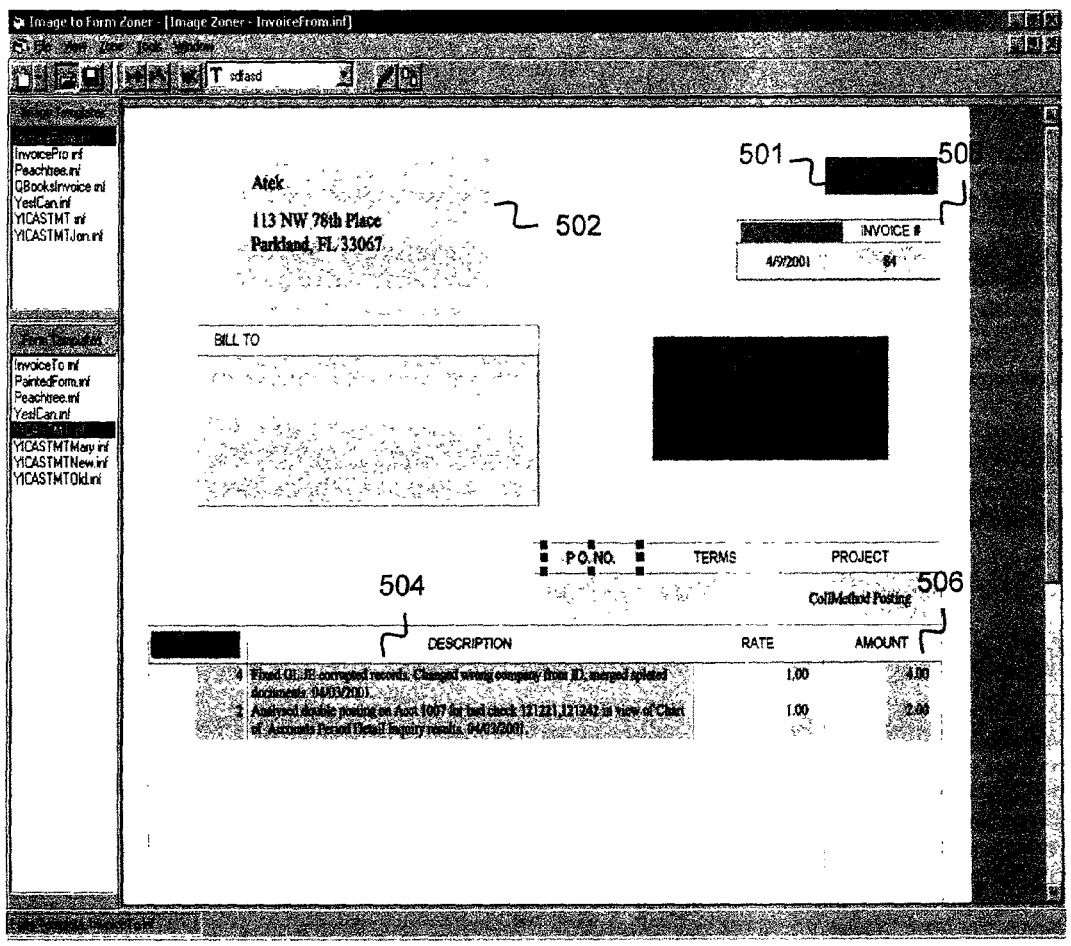
FIG. 5 is a screenshot of one embodiment of a GUI of an application of FIG. 3 used for generating a source template, according to the present invention.

FIG. 5 is a screenshot of one embodiment of a Graphical User Interface (GUI) of an application of FIG. 3 used for generating a source template. The GUI of FIG. 5 is used for performing the steps 306 and 308 of FIG. 3. The GUI shows that the invoice of FIG. 4, the source document, is graphically displayed in the window of FIG. 5. A user or programmer utilizing the GUI of FIG. 5 proceeds to select areas of the invoice using a highlighted box and then specify the type of source zone that is associated with that area. Based on the type of source zone selected for each area, the mapper 106 processes the data in each source zone in a particular way. This is described in greater detail below.

FIG. 5 shows that the user or programmer has created a highlighted box 501 over title 401. Box 501 is defined by the user or programmer as a Key Zone 502 because the title 401 contains a keyword associated with the source document. In addition, a highlighted box 502 is created over client address 402. Box 502 is defined as an Address Zone because it clearly contains an address. A highlighted box 504 has been created over transaction description column 404. Box 504 is defined as a Table Zone because box 504 contains a table of information regarding transactions. A highlighted box 506 is created over amount column 406. Box 506 is defined as a Table Zone because box 506 contains a table of information regarding the amount charged for each particular item. Lastly, a highlighted box 508 has been created over invoice number 410. Box 508 is defined as a Text Zone because box 508 contains text pertaining to the invoice number of the source document.

As explained above for step 310 of FIG. 3, once the source document is fully defined using the highlighted boxes, a source template file is generated. An example of a source template file, in text format, is shown above.

Target Template

Figure 6:
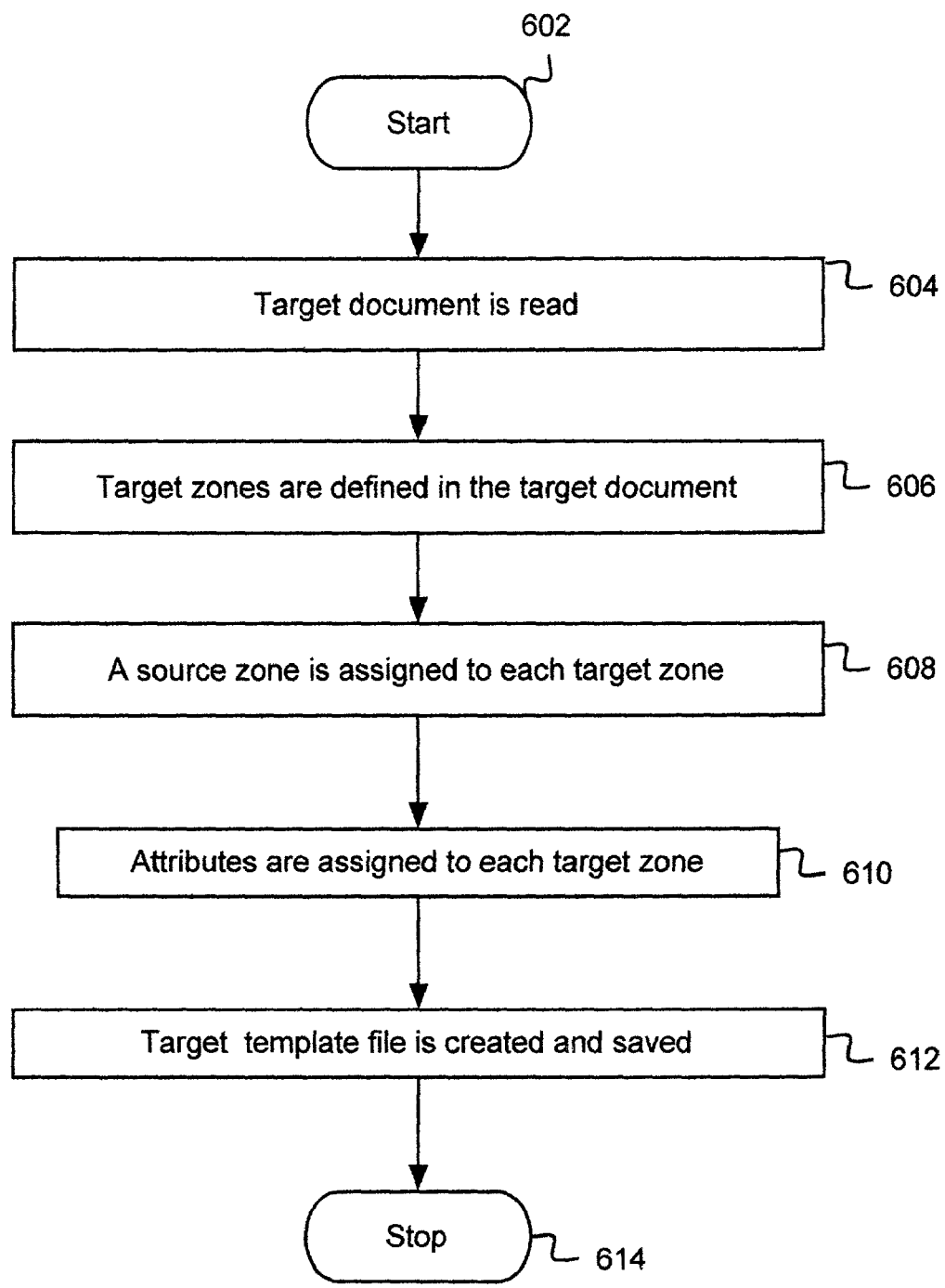
FIG. 6 is a flowchart depicting the operation and control flow of the target template generation process of one embodiment of the present invention.

FIG. 6 is a flowchart depicting the operation and control flow of the target template generation process of one embodiment of the present invention. FIG. 6 describes in more detail the step 206 of FIG. 2. The control flow of FIG. 6 begins with step 602 and flows directly to step 604. In step 604, a target document is read by an application program used for generating a target template. Such an application is described in greater detail below in FIG. 8. It should be noted that the present invention supports various types of target documents. Typically, the target document is a document containing the information from a source document and which is printed onto a business form or mailer. As explained above, the source document is an invoice, a client account statement, a billing statement, a report or the like. Thus, the target document must contain any such information. In an embodiment, the source document is an invoice, a client account statement, a billing statement, an account report, a check, a tax form (such as a 1099 Div or a 1099 R), a Customs Declaration postal form or the like. An example target document is shown below in FIG. 7.

In step 606, target zones are defined in the target document. A target zone is an area of a target document in which content information from the source document is placed. Several types of target zones are defined, wherein each type of target zone contains a certain type of content information. The following are examples of target zone types:

Key Zone: Contains keywords associated with the source document
Text Zone: Contains text
Picture Zone: Contains an image
Table Zone: Contains a table or other tabular data
Address Zone: Contains a mailing address
Locked Zone: A zone on the target document that is locked and may not be overwritten with any data
Postage Zone: Contains PC postage In step 608, a source zone is assigned to each target zone. In this step, the source content for each target zone is defined. As explained above, a target zone defines an area in which content from a source document is placed. Thus, in this step, the content from a source document, defined as a source zone, is linked to each target zone. This is explained in greater detail below.

In step 610, attributes are assigned to each target zone. The following attributes are supported for each target zone:

Parameters: Pixel coordinates defining the location of the target zone
Alignment: The horizontal or vertical alignment of the content in the target zone
Font: The font of any text that will be entered into the target zone
Expand/Crop Image: If the target zone is an Image Zone, this describes how to expand or crop the image
Image rotation: If the zone is an Image Zone, this describes how to rotate the image In step 612, a target template file is generated and saved. The target template file contains, at a minimum, a list containing each target zone, the pixel coordinates defining the location of each target zone in the target document and the source zone corresponding to each target zone. The target template file is a text file, an HTML file, an SGML file, an XML file, or any other file format conducive to holding a hierarchical structured data set. An example of a target template file written in text format, is shown below:

[Lock]
[Zones]
address=4.506,1.972,3.494,1.826,Crop,180,Right,Bottom,,,0,Times New Roman!10!
date=0.73,5.54,1.46,0.209,Crop,0,Center,Top,,, Times New Roman!10!;5.737,6.78,0.855,0.156,Crop,0,Left,Top,,,0,Times New Roman!8!
invoice=0.73,5.874,1.471,0.198,Crop,0,Center,Top,,,, Times New Roman!10!;5.747,6.927,0.855,0.146,Crop,0,Left,Top,,,,Times New Roman!8!
description=0.428,4.382,3.588,0.855,Crop,0,Left,Top,,,0, Times New Roman!7!;3.035,7.355,2.91,1.002,Crop,0,Left,Top,,,,Times New Roman!8!
amount=4.057,4.382,0.741,0.876,Crop,0,Right,Top,,,0, Courier New!7!;7.28,7.355,0.793,1.002,Crop,0,Right,Top,,,0,Courier New!8!
quantity=1.773,7.355,0.615,1.002,Crop,0,Center,Top,,,0, Courier New!8!;2.42,7.355,0.584,1.002,Crop,0,Center,Top,,,0,Courier New!8!
bill to=1.439,0.115,3.87,1.596,Crop,180,Right,Bottom,,, 0,Times New Roman!10!;2.545,5.613,2.274,0.824, Crop,0,Left,Top,,,Times New Roman!9!;0.407,8.67, 4.819,2.045,Crop,0,Left,Top,,,0,Times New Roman!10!
total=4.057,5.268,0.741,0.136,Crop,0,Right,Top,,,0,Courier New!7!B;7.468,9.097,0.605,0.167,Crop,0,Right, Top,,,0,Times New Roman!7!
pono=7.468,6.906,1.001,0.219,Crop,0,Left,Top,,,Times New Roman!8!
rate=5.956,7.355,0.772,1.002,Crop,0,Right,Top,,,0,Courier New!8!

In step 614, the control flow of FIG. 6 ceases.

FIG. 7 is a representation of a target document of FIG. 6, in one embodiment of the present invention. As described above, a target document is a business form or mailer such as those described by the section entitled Cross Referenced Applications and each incorporated herein in their entirety. The mailer of FIG. 7 is a client account statement form that used to provide a client, or customer with information regarding activity on the client's account. An invoice, such as the invoice of FIG. 4, can generate activity that is described in the client account statement of FIG. 7.

Note that the mailer of FIG. 7 already includes information including a return address and other text that indicates the type of information in the various tables. In an embodiment of the present invention, the information present in the mailer of FIG. 7 is static information that is specified by the user 102 in an optional step after step 206 of FIG. 2. This is described in greater detail above. In one alternative, the static information is pre-printed onto the mailer before the process of FIG. 2 is executed. This is advantageous in instances where the user 102 does not have the ability to print certain articles, such as magnetic ink or color logos. In another alternative, the static information is printed onto the mailer at the time that the dynamic information is printed onto the mailer in step 216 of FIG. 2.

In any case, the empty areas of the mailer of FIG. 7 will be populated with dynamic information—that is, the content extracted by the source document—in step 214 of FIG. 2. This process is described in greater detail below.

The target document of FIG. 7 shows a customer identification area 702 for identifying the party receiving the mailer. FIG. 7 also shows an invoice number column 704 for indicating the invoice number for each item purchased and an item amount column 706 for indicating the cost of each item purchased. Column 704 corresponds to column 710 and column 706 corresponds to column 712 as the client account statement duplicates this information in the target document. The total amount 708 indicates the combined cost of all items purchased. Cell 708 corresponds to cell 714.

Figure 8:
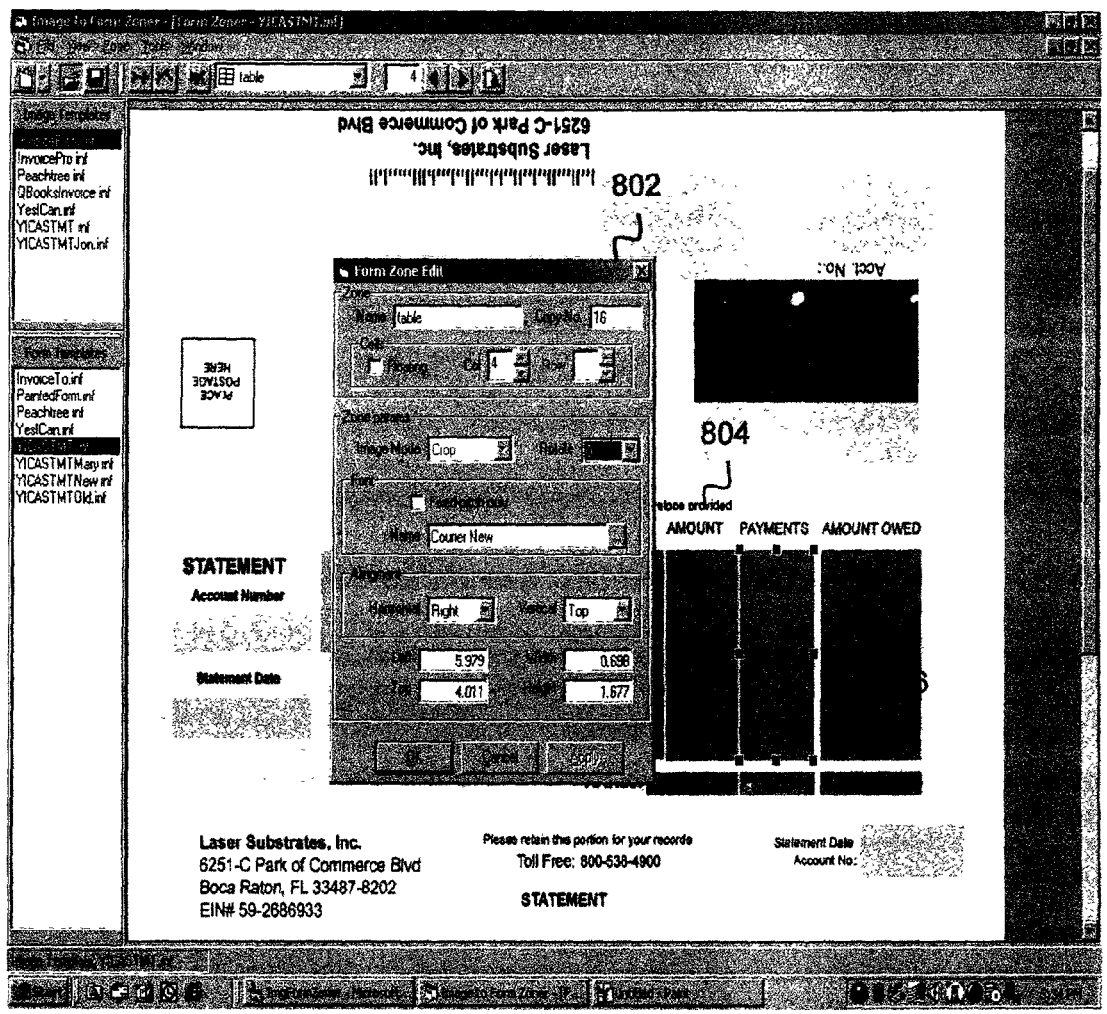
FIG. 8 is a screenshot of one embodiment of a GUI of an application used for generating a target template of FIG. 6, according to the present invention.

FIG. 8 is a screenshot of one embodiment of a GUI of an application used for generating a target template of FIG. 6, according to the present invention. The GUI of FIG. 8 is used for performing the steps 606–610 of FIG. 6. The GUI of FIG. 8 shows that the target document of FIG. 7 is graphically displayed in the window of FIG. 8. A user or programmer utilizing the GUI of FIG. 8 selects an area in the target document using a highlighted box and then specifies the type of target zone that is associated with that area. A list of target zones is given above. Further, the user or programmer also defines for each target zone the content that shall be entered into that area. That is, each target zone is assigned a source zone from which content is used to populate the target zone. The user accomplishes this by selecting for each target zone a source zone from a master list of source zones. The master list is created during the process of source template generation, such as described in FIG. 3. Based on the source zone selected for each target zone, the mapper 106 populates each target zone accordingly. This is described in greater detail below.

FIG. 8 illustrates that the user or programmer has created a highlighted box 804 over an item amount column (corresponding to column 706 of FIG. 7) for indicating the cost of each item purchased. Box 804 is defined by the user or programmer as a Table Zone because box 804 contains a table of information regarding item costs. A highlighted box 806 has been created over the total amount cell (corresponding to cell 708) for indicating the combined cost of all items purchased. Box 806 is defined as a Text Zone because box 806 contains simple text.

In an embodiment of the present invention, in addition to specifying the source zone associated with each target zone, the user or programmer can also specify attributes for each target zone. For example, using the pop-up GUI 802, the user or programmer can modify various attributes of each target zone. Pop-up GUI 802 shows that the following target zone attributes can be specified: the location of the target zone, the alignment of the text in the target zone, the font of the text in the target zone, the manner in which to expand or crop an image that shall be placed in the target Image Zone and the manner in which to rotate an image that shall be placed in the target Image Zone.

In an embodiment of the present invention, once the target document is fully defined using the highlighted boxes and pop-up GUI 802, a target template file is created. The target template file contains, at a minimum, a list of each target zone, the location of each target zone and the source zone associated with the target zone. An example of a target template file, in text format, is shown above.

The Mapper

Figure 9:
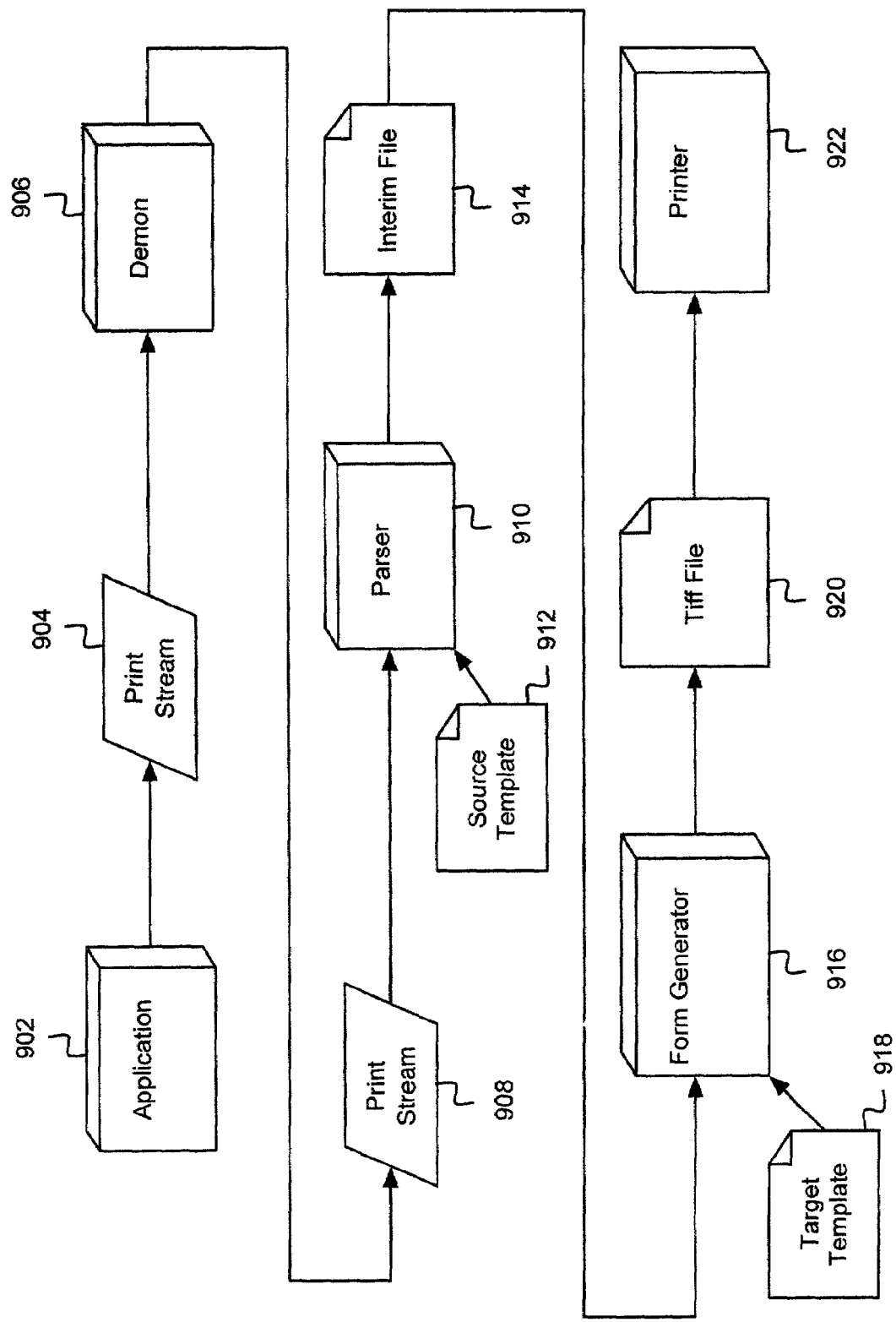
FIG. 9 is a functional diagram illustrating the mapping process of FIG. 1 according to one embodiment of the present invention.

FIG. 9 is a functional diagram illustrating the mapping process of FIG. 1 according to the present invention. FIG. 9 provides more detail of the process represented by step 214 of FIG. 2. FIG. 9 shows that an application 902, corresponding to application 104, has sent a print stream 904 containing a source document. The print stream 904 is subsequently captured by a demon 906. A demon 906 is an application program that resides on a client computer system for the purpose of performing a specified process at a predefined time or in response to a particular event. The demon, in one example, is a specialized printer driver. In this case, demon 906 receives the print stream 904, initiates the mapper 106 and redirects the print stream 904 as print stream 908 to the mapper 106. Mapper 106 is represented in FIG. 9 by functional block 910 representing the parser function and functional block 916 representing the form generating function. In an embodiment of the present invention, demon 906 is not present. In this embodiment, the print stream 904 is received directly by parser 910 from application 902.

The first operation performed by mapper 106 is the parsing of the print stream 908 by parser 910 using the source template 912, which was defined in the process of FIG. 3. In an embodiment of the present invention, parser 910 converts the format of the print stream 908 to a TIFF file format before parsing. In any event, the product of the operation of parser 910 is an interim file 914 containing the content that has been extracted from the print stream 908 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content shall be entered into the specified target zones of the target template 918, as described in FIG. 6 above. The product of form generator 916 is a TIFF file 920. The TIFF file 920 is then sent to printer 922 for printing.

Figure 10A:
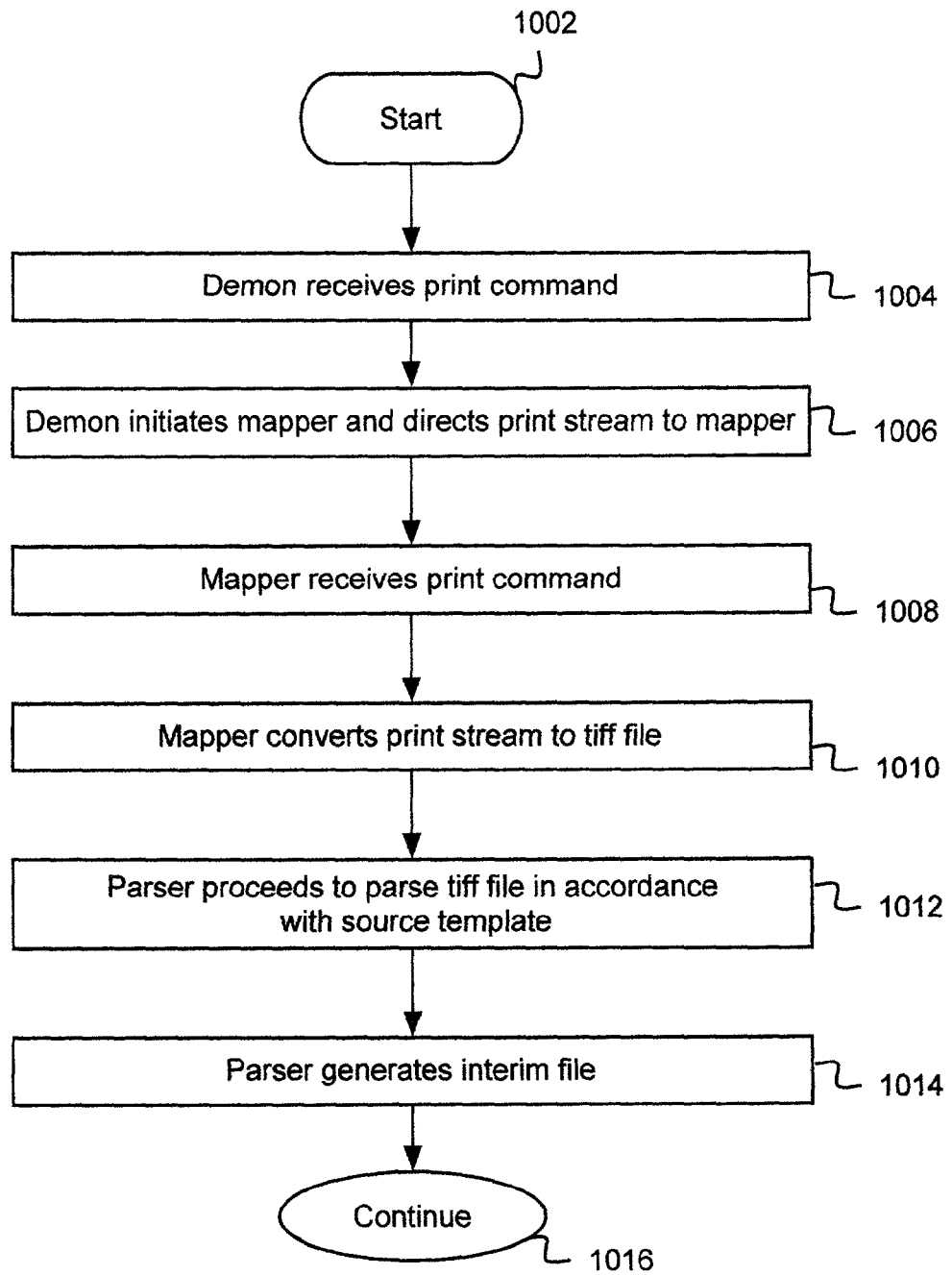
FIG. 10A is a flowchart depicting the operation and control flow of the mapping process of FIG. 8 according to the present invention.
Figure 10B:
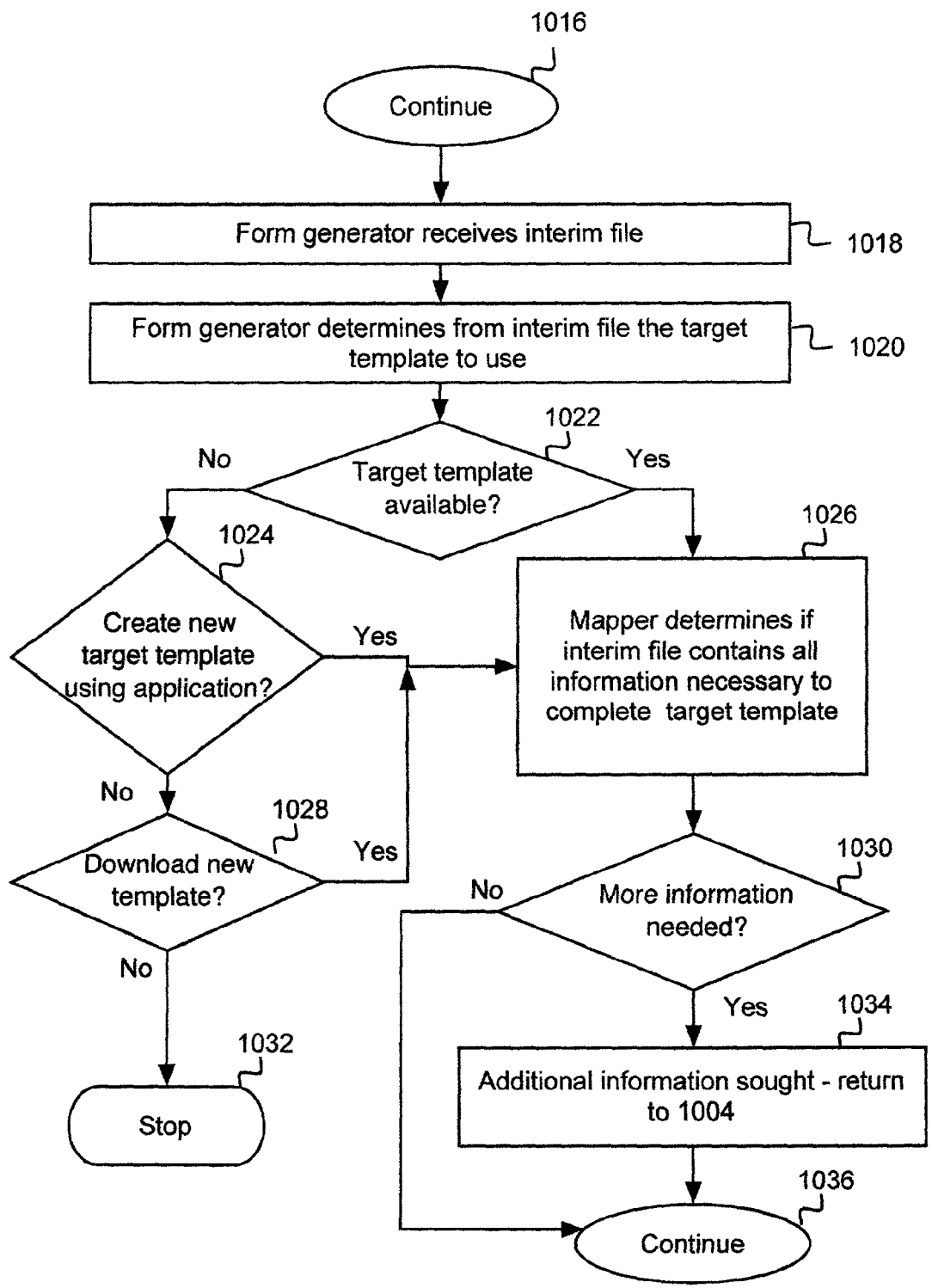
FIG. 10B is a continuation flowchart if FIG. 10A, in one embodiment of the present invention.
Figure 10C:
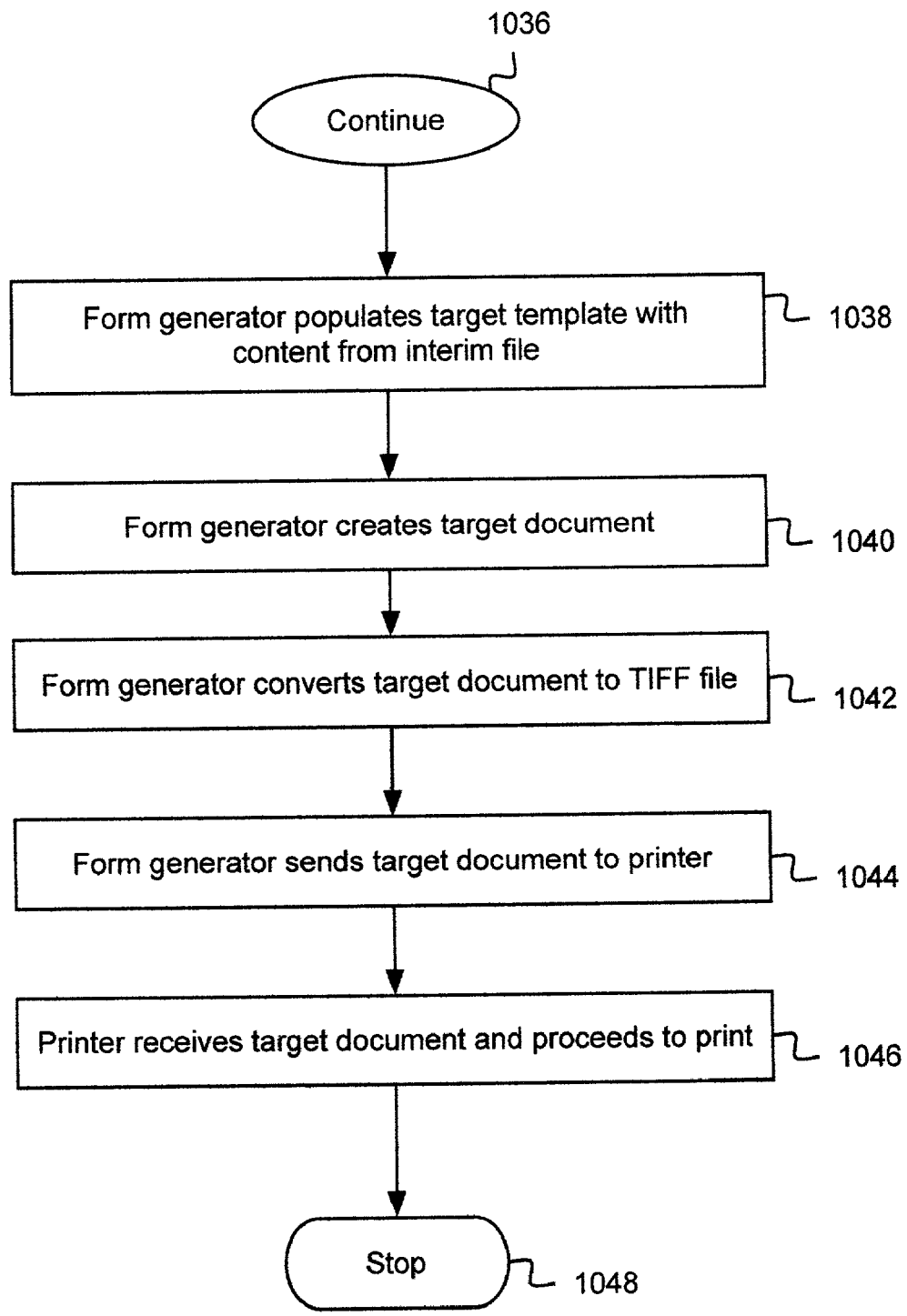
FIG. 10C is a continuation flowchart if FIG. 10B, in one embodiment of the present invention.

FIGS. 10A, 10B and 10C are flowcharts depicting the operation and control flow of the mapping process of one embodiment of the present invention. FIGS. 10A, 10B and 10C provide additional detail of the process represented by step 210 of FIG. 2. The control flow of FIGS. 10A, 10B and 10C begins with step 1002 and flows directly to step 1004. In step 1004, the demon 906 receives the print stream 904. In step 1006, the demon 906 initiates the mapper 106 and redirects the print stream 904, now print stream 908, to the mapper 106. In step 1008 the parser 910 of mapper 106 receives the print stream 908. In step 1010, in an embodiment of the present invention, parser 910 converts the format of the print stream 908 to a TIFF file format before parsing.

In step 1012, the parser 910 of mapper 106 parses the print stream 908 in accordance with a predefined source template 912. In this step, the parser 910 performs Optical Character Recognition (OCR) procedures on Text Zones of the source document as defined by the source template 912. In addition, the parser 910 generates image format copies for all other specified source zones of the source document as defined by the source template 912. In step 1014, the output of step 1012 is an interim file 914 that contains all content (image, text, etc.) extracted from the source document. Control flows from step 1014 to step 1016 and immediately continues with step 1018 of FIG. 10B.

In an embodiment of the present invention, the parser 910 of mapper 106, in step 1012, determines the source template 912 to use for each particular source document by performing OCR in Key Zones of the source document. The parser 910 subsequently attempts to match the text extracted from a Key Zone with text defined in source templates 912. Once a match is made, the corresponding source template 912 is used to parse the source document. This is useful when there are multiple source templates 912 defined for source documents.

In step 1018, the form generator 916 receives interim file 914. In step 1020, the form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents.

In step 1022, the form generator 916 determines whether the appropriate target template 918 (chosen as the appropriate target template 918 in step 1020) is available, If the result of this determination is positive, the form generator 916 accesses the appropriate target template 918 and control flows to step 1026. If the result of this determination is negative, control flows to step 1024. In step 1024, the form generator 916 determines whether an appropriate target template 918 can be produced using an application, such as the target template generation application described in FIG. 8. If the result of the determination of step 1024 is positive, a user or a programmer uses an application such as described in FIG. 8 to produce the appropriate target template 918 and control flows to step 1026. If the result of the determination of step 1024 is negative, control flows to step 1028. In step 1028, the form generator 916 determines whether an appropriate target template 918 can be downloaded from a web site or other entity via a network. If the result of the determination of step 1028 is positive, the appropriate target template 918 is downloaded and control flows to step 1026. If the result of the determination of step 1028 is negative, control flows to step 1032.

In step 1026, the form generator 916 reviews the information interim file 914 and compares it to the information required to complete the target template 918. In step 1030, the form generator 916 determines whether the interim file 914 contains all of the information necessary to complete the target template 918. If the form generator 916 determines that more information is necessary, the form generator 916 seeks the required information and control flows to step 1034. If the form generator 916 determines that more information is not necessary, control flows to step 1036.

In an embodiment of the present invention, in step 1034, the mapper 106 automatically seeks the required information. Mapper 106 can accomplish this task by searching for a file or data set that contains the required information. Alternatively, the mapper 106 can communicate to application 104 the data that it requires and subsequently receive the required information from the application 104. In another embodiment, the mapper 106 can prompt the user 102 to provide the required information by providing another print stream that contains the required information. As explained above, the mapper 106 can communicate with the user 102 via a pop-up window that describes to the user 102 the required information. In step 1032, the control flow of FIG. 10 ceases. Control flows from step 1034 to step 1036 and immediately continues with step 1038 of FIG. 10C.

In step 1038, the form generator 916 of mapper 106 produces a target document by populating the target zones of target template 918 using the content in interim file 914, as specified by the target template 918. In an embodiment of the present invention, in step 1038, the form generator 916 also populates the target document with static content information specified by the user in an optional step after step 206 of FIG. 2. In step 1040, the form generator 916 generates the target document.

In step 1042, the form generator 916 converts the target document to a TIFF file 920. In an embodiment of the present invention, in step 1042, form generator 916 may also convert the target document into a printer format that is supported by printer 922. For example, the original print stream 904 may have been directed towards a particular type of printer, such as a non-impact printer, a laser printer, an inkjet printer, a bubblejet printer, a dot matrix printer, a thermal printer, or the like. In this case, the form generator 916 converts the target document into a printer format that is supported by printer 922. In step 1044, the form generator 916 sends the TIFF file 920 to the printer 922 for printing. In step 1046, the printer 922 receives the TIFF file 920 and proceeds to print the file. In step 1048, the control flow of FIG. 10 ceases.

File Format Conversion

In an embodiment of the present invention, mapper 106 performs file format conversion between applications and/or operating systems having incompatible file format. In this embodiment, the mapper 106 captures a print stream containing a source document that was sent to a printer by a first application executing in a first operating system (OS). Subsequently, the mapper 106 proceeds to generate a target document in a file format that is supported by a second application executing in a second operating system. This is described in greater detail below.

This process is advantageous as it provides for increased compatibility between different applications and OS's. Unlike the previous embodiments, the output destination here is an application or OS. As an example of a situation wherein the aforementioned process is advantageous, consider a small business that utilizes a PC-based small business financial software application such as Quickbooks. As the small business grows into a middle sized business, the firm decides to utilize a Unix-based financial software application. As a result, the firm is faced with the problem of porting all of its' current PC-based Quickbooks files and databases to a Unix-based software application. Using the proposed invention, the business sends the PC-based QuickBooks files in a print stream to a converter module. The converter module then converts the information in the print stream into a format that is compatible with the Unix-based software application.

Figure 11:
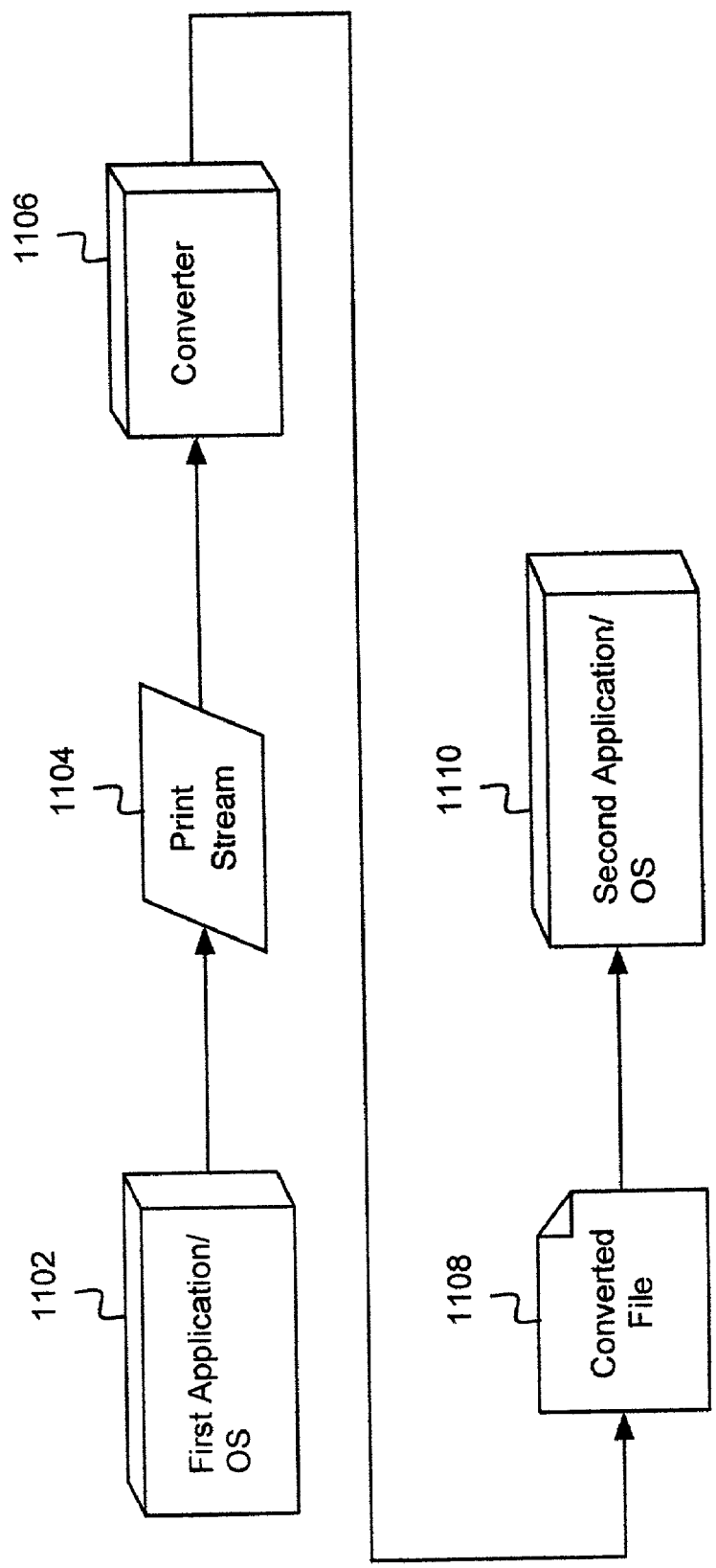
FIG. 11 is a functional diagram illustrating the file conversion process of another embodiment of the present invention.

FIG. 11 is a functional diagram illustrating the file conversion process of another embodiment of the present invention. FIG. 11 shows a first application executing in a first OS 1102. In this embodiment, the first application/OS 1102 produces files and/or databases that are not compatible with a second application executing in a second OS 1110. First application/OS 1102 subsequently produces print stream 1104 containing a source document. Then, print stream 1104 is received by converter 1106, representing a module of mapper 106. Converter 1106 proceeds to convert print stream 1104 into a converted file 1108, which conforms to a format supported by second application/OS 1110. The manner in which converter 1106 converts the print stream 1104 is described in greater detail below. Subsequently, second application/OS 1110 receives the converted file 1108.

In an embodiment of the present invention, the first application is not compatible with the second application and the first OS is not compatible with the second OS. In this case, the converter 1106 must convert between incompatible applications and operating systems. In another embodiment of the present invention, the first application is identical to the second application and the first OS is not compatible with the second OS. In this case, the converter 1106 must convert only between incompatible operating systems. In yet another embodiment of the present invention, the first application is not compatible with the second application and the first OS is identical to the second OS. In this case, the converter 1106 must convert only between incompatible applications.

In another embodiment of the present invention, the conversion process executed by converter 1106 also includes the conversion of a print stream into a format compatible with a particular type of printer. This embodiment is advantageous in situations where the first application/OS 1102 does not support a particular type of printer, such as an impact printer. Using the proposed invention, the print stream 1104 is converted into a format that is compatible with impact printers and provided to second application/Os 1110 for printing.

In yet another embodiment of the present invention, the converter 1106 is a separate software application that is available to user 102 for converting files. In this embodiment, upon the recognition that the documents produced by a first application/OS 1102 are not compatible with a second application/OS 1110, a user 102 accesses the converter 1106 and executes converter 1106 to convert the incompatible files at issue. In one alternative, the converter 1106 is available to user 102 on removable storage medium such as a CD or a floppy disk. In another alternative, the converter 1106 is available to user 102 for download from a web page or web site.

Figure 12:
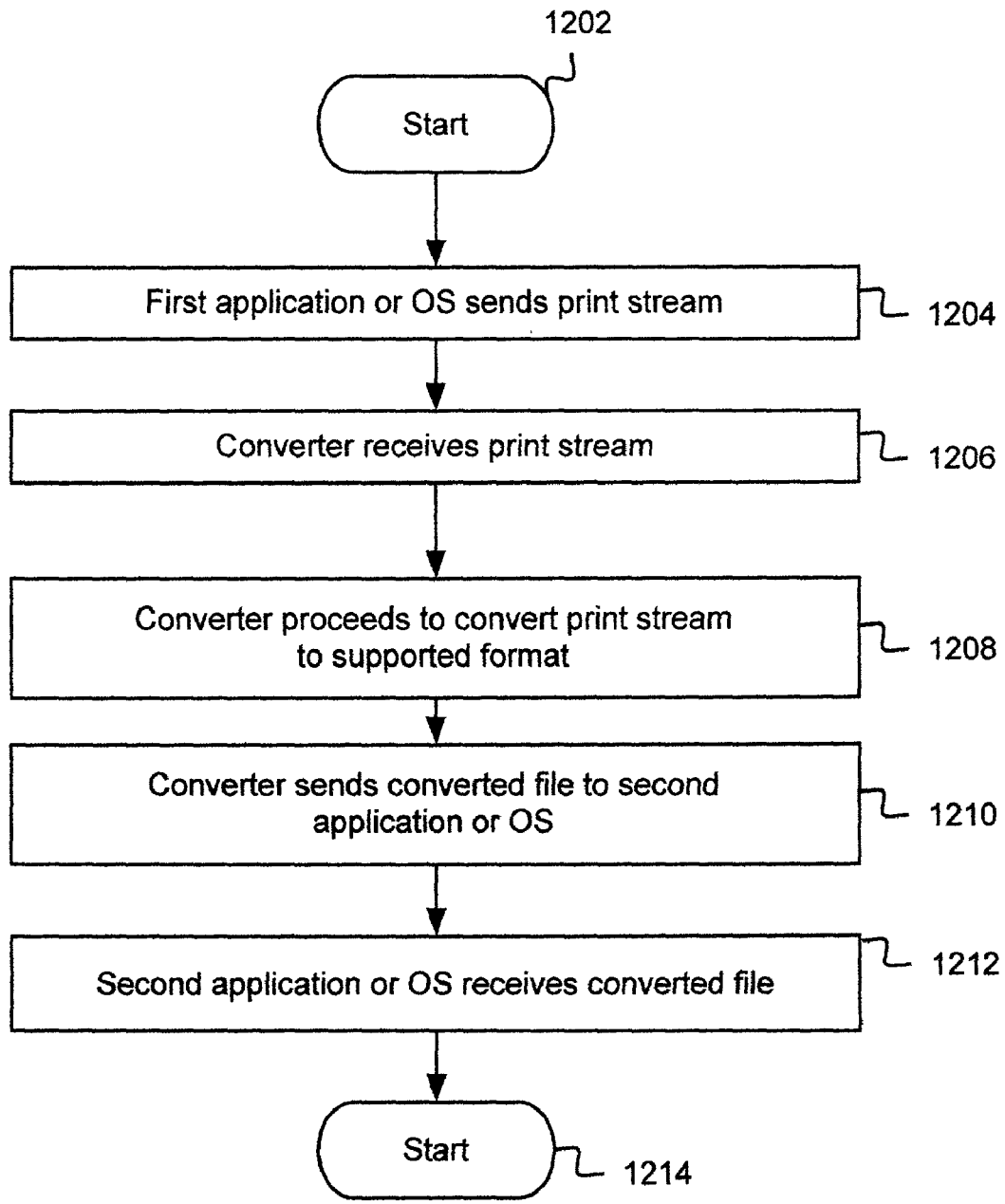
FIG. 12 is a flowchart depicting the operation and control flow of the file conversion process of FIG. 11 according to the present invention.

FIG. 12 is a flowchart depicting the operation and control flow of the file conversion process of FIG. 11 according to the present invention. FIG. 12 provides additional detail of the process represented by functional module 1106 of FIG. 11. The control flow of FIG. 12 begins with step 1202 and flows directly to step 1204. In step 1204, first application/OS 1102 produces a print stream 1104 containing a source document. In step 1206, converter 1106 receives the print stream 1104. In step 1208, converter 1106 converts the print stream 1104 into a format supported by second application or OS 1110.

In one embodiment of the present invention, converter 1106 accomplishes the task of step 1208 using a process similar to the process defined in FIG. 2 above. That is, for each type of source document, a template is generated which defines the content in the source document, and for each target document, a template is generated which defines the source of the content in the target document. Subsequently, the target document is generated upon the provision of a source document via a print stream. In another embodiment of the present invention, the converter 1106 accomplishes the task of step 1208 by modifying file header information or other file metadata information of the document extracted from print stream 1104 in order to generate a file that is compatible and readable by the second application/OS 1110. In step 1210, converter 1106 sends the converted file 1108 to the second application/OS 1110. In step 1212, the second application/OS 1110 receives the converted file 1108. In step 1214, the control flow of FIG. 12 ceases.

PC Postage

In an embodiment of the present invention, the proposed invention can modify PC postage printed onto a business form or mailer, while adhering to security measures protecting PC postage from tampering. In this embodiment, the form generator 916 of the mapper 106 receives the PC postage for insertion into the target document. The form generator 916 receives the PC postage either from the source document in step 210 of FIG. 2 or directly from PC postage software provided by a PC postage provider during the target document generation step 214. Examples of current PC postage providers are Pitney-Bowes, Endicia, Stamps.com and Neopost. In the case where the PC postage is received directly from PC postage software, the user 102 is given the option of selecting the PC postage provider. Once the PC postage is received, the form generator 916 can proceed to reposition or rotate the PC postage during the target document generation step 214. In doing so, the security measures protecting the PC postage are followed. Furthermore, the postal regulations defining the proper placement of the PC postage are complied with. This allows the user 102 more flexibility in positioning the PC postage onto the business form or mailer.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 13:
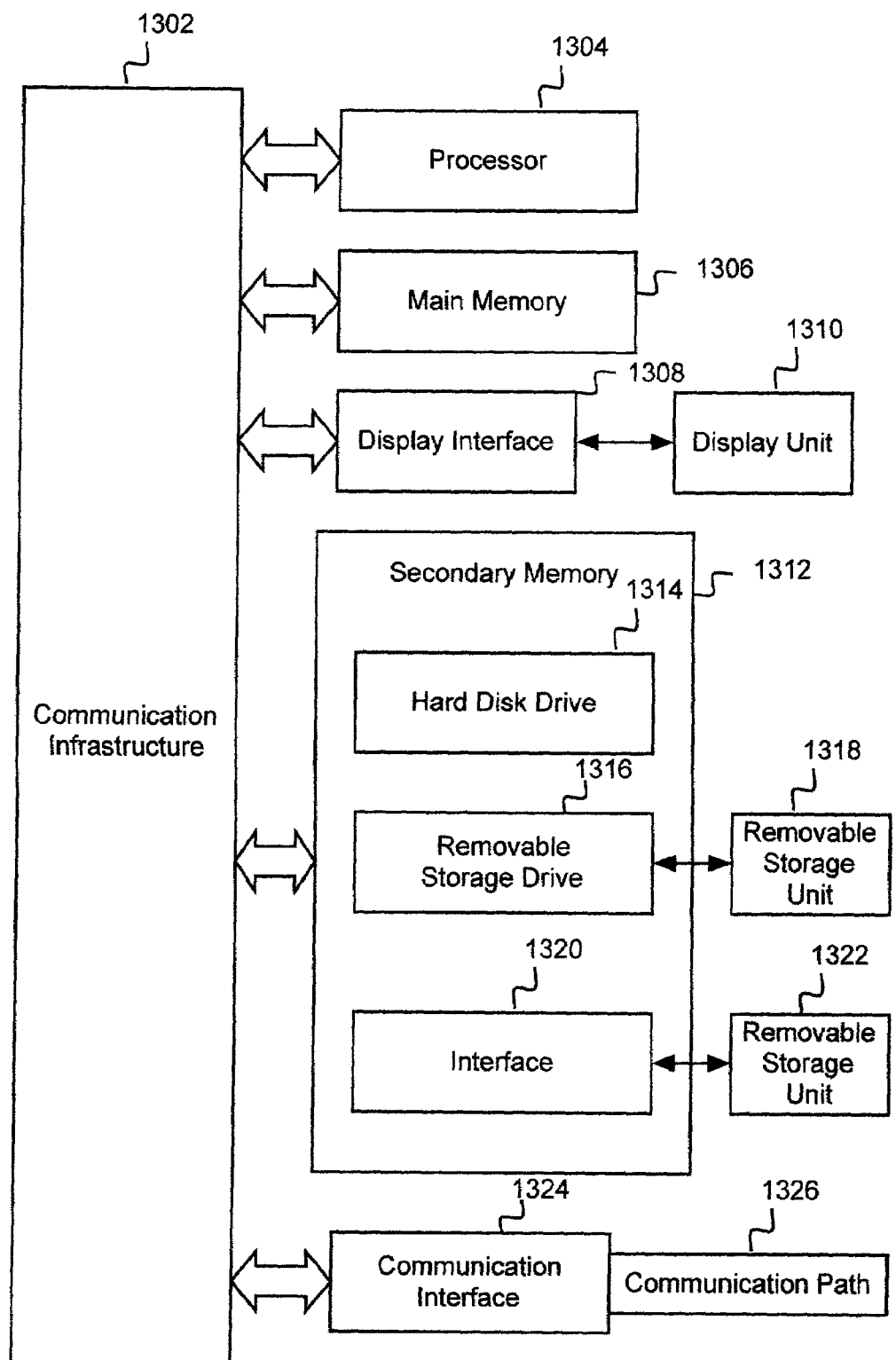
FIG. 13 is a block diagram of a computer system useful for implementing the present invention.

FIG. 13 is a block diagram of a computer system useful for implementing an embodiment of the present invention. The computer system includes one or more processors, such as processor, 1304. The processor 1304 is connected to a communication infrastructure 1302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1308 that forwards graphics, text, and other data from the communication infrastructure 1302 (or from a frame buffer not shown) for display on the display unit 1310. The computer system also includes a main memory 1306, preferably random access memory (RAM), and may also include a secondary memory 1312. The secondary memory 1312 may include, for example, a hard disk drive 1314 and/or a removable storage drive 1316, representing a floppy disk drive, a magnetic tape drive, an optical disk drive, etc. The removable storage drive 1316 reads from and/or writes to a removable storage unit 1318 in a manner well known to those having ordinary skill in the art. Removable storage unit 1318, represents a floppy disk, magnetic tape, optical disk, etc. which is read by and written to by removable storage drive 1316. As will be appreciated, the removable storage unit 1318 includes a computer usable storage medium having stored therein computer software and/or data.

In alternative embodiments, the secondary memory 1312 may include other similar means for allowing computer programs or other instructions to be loaded into the computer system. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system.

The computer system may also include a communications interface 1324. Communications interface 1324 allows software and data to be transferred between the computer system and external devices. Examples of communications interface 1324 may include a modem, a network interface (such as an Ethernet card), a communications port, a PCM-CIA slot and card, etc. Software and data transferred via communications interface 1324 are in the form of signals which may be, for example, electronic, electromagnetic, optical, or other signals capable of being received by communications interface 1324. These signals are provided to communications interface 1324 via a communications path (i.e., channel) 1326. This channel 1326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1306 and secondary memory 1312, removable storage drive 1316, a hard disk installed in hard disk drive 1314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein. In particular, the computer programs, when executed, enable the processor 1304 to perform the features of the computer system. Accordingly, such computer programs represent controllers of the computer system.

Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. A method on an information processing system coupled to a printer for mapping print stream data for printing to an output destination, the method performed on the information processing system by reading instructions from a storage medium for performing the method comprising:

displaying on a graphical user interface a target document for receiving content being parsed from a source document, wherein in the target document is an image of a business form compatible with a simplex non-impact printer with at least one destination location for printing at least a portion of the content in the source document thereon;

graphically indicating on the user interface at least one destination location in the target document for printing the content in the source document thereon;

receiving a print stream including the source document;

parsing the source document for content, wherein the source document is parsed using a source template that defines content in the source document;

generating the target document including the content that has been parsed, wherein the target document is generated using a target template that defines content in the target document; and sending the target document to an output destination.

2. The method of claim 1, wherein parsing the source document includes:

displaying on the graphical user interface the source document for denoting content to be parsed therefrom;

graphically indicating on the user interface at least one source location in the source document for parsing content therefrom;

parsing the source document for content, wherein the source document is parsed using a source template and wherein the source template includes:

a source location of content in the source document; and a source type of content in the source document.

3. The method of claim 2, wherein generating a target document includes:

generating a target document including the content that has been parsed, wherein the target document is generated using a target template and wherein the target template comprises:
the content that has been parsed from the source document that is included in the target document;
a destination location of content in the target document; and
a destination type of content in the target document.

4. The method of claim 3, further comprising:
converting the target document into a format compatible with a third party application prior to sending the target document to an output destination.

5. The method of claim 1, wherein generating a target document includes:
generating a target document including the content that has been parsed and content predefined by a user, wherein the target document is generated using a target template that defines content in the target document.

6. The method of claim 5, wherein the content predefined by a user includes at least one of:
a PC postage provider;
a signature; and
a logo.

7. The method of claim 1, wherein parsing the source document includes:
parsing the source document for content using a source template that defines content in the source document, wherein the source template is chosen automatically based on the content recognized with automatic character recognition in the source document.

8. The method of claim 7, wherein generating a target document includes:
generating a target document including the content that has been parsed using a target template that defines content in the target document wherein the target template is automatically chosen based on matching the content in the source document with the content in the target document.

9. The method of claim 1, wherein the target document is at one of a Customs Declaration and a mailing form.

10. The method of claim 1, further comprising:
restricting access to the source template by including the following levels of access;
a user level of access;
an administrator level of access;
a level of access for modification of a signature in a target document; and
a level of access allowing complete access to the method.

11. A computer readable medium including computer instructions for mapping print stream data for printing to an output destination, the computer instructions including instructions for:
displaying on a graphical user interface a target document for receiving content being parsed from a source document, wherein in the target document is an image of a business form compatible with a simplex non-impact printer with at least one destination location for printing at least a portion of the content in the source document thereon;
graphically indicating on the user interface at least one destination location in the target document for printing the content in the source document thereon;
receiving a print stream including the source document;
parsing the source document for content, wherein the source document is parsed using a source template that defines content in the source document;
generating the target document including the content that has been parsed, wherein the target document is generated using a target template that defines content in the target document; and
sending the target document to an output destination.

12. The computer readable medium of claim 11, wherein the instructions for parsing comprise:
displaying on the graphical user interface the source document for denoting content to be parsed therefrom;
graphically indicating on the user interface at least one source location in the source document for parsing content therefrom;
parsing the source document for content, wherein the source document is parsed using a source template and wherein the source template includes:
a source location of content in the source document; and
a source type of content in the source document.

13. The computer readable medium of claim 12, wherein the instructions for generating comprise:
generating a target document including the content that has been parsed, wherein the target document is generated using a target template and wherein the target template comprises:
the content that has been parsed from the source document that is included in the target document;
a destination location of content in the target document; and
a destination type of content in the target document.

14. The computer readable medium of claim 13, further comprising instructions for:
converting the target document into a format compatible with a third party application prior to sending the target document to an output destination.

15. The computer readable medium of claim 11, wherein the instructions for generating comprise:
generating a target document including the content that has been parsed and content predefined by a user, wherein the target document is generated using a target template that defines content in the target document.

16. The computer readable medium of claim 15, wherein the content predefined by a user includes at least one of:
a PC postage provider;
a signature; and
a logo.

17. The computer readable medium of claim 11, wherein the instructions for parsing comprise:
parsing the source document for content using a source template that defines content in the source document, wherein the source template is automatically chosen based on recognized with automatic character recognition the content in the source document.

18. The computer readable medium of claim 17, wherein the instructions for generating comprise:
generating a target document including the content that has been parsed using a target template that defines content in the target document wherein the target template is automatically chosen based on matching the content in the source document with the content in the target document.

19. The computer readable medium of claim 11, wherein the target document is at one of a Customs Declaration and a mailing form.

20. The computer readable medium of claim 11, further comprising instructions for:

restricting access to the source template, wherein the instructions for restricting access includes the following levels of access;
a user level of access:
an administrator level of access;
a level of access for modification of a signature in a target document; and
a level of access allowing complete access to the computer readable medium.

21. The computer readable medium of claim 11, wherein the computer readable medium is provided on the Internet for download.

22. An information precessing system coupled to an output of an information processor, the information processing system for mapping print stream data to an output destination, the system comprising:
a graphical user interface for displaying a target document for receiving content being parsed from a source document, wherein in the target document is an image of a business form compatible with a simplex non-impact printer with at least one destination location for printing at least a portion of the content in the source document thereon;
a user input device for graphically indicating on the user interface at least one destination location in the target document for printing the content in the source document thereon;
a software application that produces at least one print stream including the source document;
a parser routine for parsing the source document for content, wherein the source document is parsed using a source template that defines content in the source document;
a document generator routine for generating target document including the content that has been parsed, wherein the target document is generated using a target template that defines content in the target document; and
at least one of an application and an operating system to which the target document is transmitted.

23. The system of claim 22, wherein the a graphical user interface further comprises displaying the source document for denoting content to be parsed therefrom and graphically indicating on the user interface at least one source location in the source document for parsing content therefrom;
a parser for parsing the source document for content, wherein the source document is parsed using a source and wherein the source template includes:
a source location of content in the source document; and
a source type of content in the source document.

24. The system of claim 23, wherein the document generator routine comprises:
a document generator for generating a target document including the content that has been parsed, wherein the target document is generated using a target template and wherein the target template comprises:
the content that has been parsed from the source document that is included in the target document;
a destination location of content in the target document; and
a destination type of content in the target document.

25. The system of claim 24, further comprising:
a converter for converting the target document into a format compatible with a third party application prior to sending the target document to the at least one of an application and an operating system.

26. The system of claim 22, wherein the document generator routine comprises:
a document generator for generating a target document including the content that has been parsed and content predefined by a user, wherein the target document is generated using a target template that defines content in the target document.

27. The system of claim 26, wherein the content predefined by a user includes at least one of:
a PC postage provider;
a signature; and
a logo.

28. The system of claim 22, wherein the parser routine comprises: a parser for parsing the source document for content using a source template that defines content in the source document, wherein the source template is chosen automatically based on the content recognized with automatic character recognition in the source document.

29. The system of claim 28, wherein the document generator routine comprises:
a document generator for generating a target document including the content that has been parsed using a target template that defines content in the target document wherein the target template is automatically chosen based on matching the content in the source document with the content in the target document.

30. The system of claim 22, wherein the target document is at one of a Customs Declaration and a mailing form.

31. The system of claim 22, the system further comprising:
means for restricting access to the source document, wherein the means for restricting access includes the following levels of access:
a user level of access;
an administrator level of access;
a level of access for modification of a signature in a target document; and
a level of access allowing complete access to the system.

32. A computer program product for mapping print stream data for printing to an output destination, the computer program product comprising:
a storage medium readable by a processing circuit and storing computer instructions for execution by the processing circuit for performing a method comprising:
displaying on a graphical user interface a target document for receiving content being parsed from a source document wherein in the target document is an image of a business form compatible with a simplex non-impact printer with at least one destination location for printing at least a portion of the content in the source document thereon;
graphically indicating on the user interface the at least one destination location in the target document for printing the content in the source document thereon;
receiving a print stream from a third party software application, the print stream including source document;
parsing the source document for content, wherein the source document is parsed using a source template that defines content in the source document;
generating the target document including the content that has been parsed, wherein the target document is generated using a target template that defines content in the target document;

sending the target document to an output destination; and printing the target document on the business form.

33. A computer program product for mapping print stream data for printing to an output destination, the computer program product comprising:
    a storage medium readable by a processing circuit and storing computer instructions for execution by the processing circuit for performing a method comprising:
        displaying on a graphical user interface a target document for receiving content being parsed from a source document, wherein in the target document is an image of a business form compatible with a simplex non-impact printer with at least one destination location for printing at least a portion of the content in the source document thereon;
        graphically indicating on the user interface the at least one destination location in the target document for printing the content in the source document thereon;
        receiving a print stream from a first software application, the print stream including source document, wherein the first software application is not compatible with a second software application;
        parsing the source document for content, wherein the source document is parsed using a source template that defines content in the source document;
        performing automatic character recognition on a portion of the content identified by the source template so as to extract the text therefrom, wherein the text is to be printed on the at least one destination location;
        generating the target document including the content that has been parsed, wherein the target document is generated using a target template that defines content in the target document; and
        sending the target document to the second software application, wherein the target document is compatible with the second software application.

34. A computer program product for mapping print stream data for printing to an output destination, the computer program product comprising:
    a storage medium readable by a processing circuit and storing computer instructions for execution by the processing circuit for performing a method comprising:
        displaying on a graphical user interface a target document for receiving content being parsed from a source document, wherein in the target document is an image of a business form compatible with a simplex non-impact printer with at least one destination location for printing at least a portion of the content in the source document thereon;
        graphically indicating on the user interface the at least one destination location in the target document for printing the content in the source document receiving a print stream from a software application executing in a first operating system, the print stream including the source document, wherein the first operating system is not compatible with a second operating system;
        parsing the source document for content, wherein the source document is parsed using a source template that defines content in the source document;
        generating the target document including the content that has been parsed, wherein the target document is generated using a target template that defines content in the target document; and
        sending the target document to a software application executing in the second operating system, wherein the target document is compatible with the second operating system.

35. A computer program product for mapping print stream data for printing to an output destination, the computer program product comprising:
    a storage medium readable by a processing circuit and storing computer instructions for execution by the processing circuit for performing a method comprising:
        displaying on a graphical user interface a target document for receiving content being parsed from a source document, wherein in the target document is an image of a business form compatible with a simplex non-impact printer with at least one destination location for printing at least a portion of the content in the source document thereon;
        graphically indicating on the user interface the at least one destination location in the target document for printing the content in the source document thereon, wherein the graphically indicating includes highlighting the at least one destination location to indicate that the at least one destination location is selected for printing the content in the source document thereon;
        displaying an attribute window for allowing a user to associate attributes of at least one of:
            a font type with the portion of the content to be printed at the destination location on the business form; and
            an orientation format with the portion of the content to be printed at the destination location on the business form;
        receiving a print stream including the source document;
        parsing the source document for content, wherein the source document is parsed using a source template that defines content in the source document;
        generating the target document including the content that has been parsed, wherein the target document is generated using a target template that defines content and associated attributes thereof in the target document; and
        printing the target document on the business form.

* * * * *